Patented Mar. 1, 1938

2,109,591

UNITED STATES PATENT OFFICE 2,109,591

PROCESS FOR COAGULATING OR PRECIPITATING VISCOSE

Leon Lilienfeld, Vienna, Austria

No Drawing. Application May 29, 1929, Serial No. 367,153. Renewed August 16, 1935. In Austria June 18, 1928

18 Claims. (Cl. 18—54)

This invention is based on the observation that solutions of caustic alkalies or of alkali metal sulphides have a coagulating or precipitating action on viscose when they are brought in contact with viscose at a high or moderately raised temperature.

The solutions of caustic alkalies or of alkali metal sulphides may also be used in combination with other agents for precipitating or coagulating viscose, a suitable proportion of such other agent or agents (for instance a salt of neutral or alkaline reaction such as sodium chloride, sodium sulphate, sodium silicate, sodium aluminate, sodium zincate, borax, sodium phosphate, sodium acetate or sodium thiosulphate) being incorporated with the solution of caustic alkali or alkali metal sulphide. These salts do not have an acid reaction (to litmus and similar indicators) and can be referred to as "non-acid" salts. They serve to assist the action of the caustic alkali or alkali sulphide solution. This will be illustrated in Example 14.

The following examples illustrate the invention:—

*Example 1.*—A viscose containing about 6.5 per cent of cellulose determinable by analysis and about 8 per cent. of sodium hydroxide is spread in the form of a film on a glass plate; the latter is then introduced into a solution of caustic soda of 18 per cent. strength maintained at 104° C. and allowed to remain in the solution for 6 to 10 minutes, depending upon the thickness of the film. The film is then immersed in boiling water for 1 minute, washed with cold water and dried.

*Example 2.*—The procedure is as in Example 1, with the exception that instead of the caustic soda solution of 18 per cent. strength there is used a caustic soda solution of 22.5 per cent. strength, maintained at 100–120° C. and the duration of the treatment with the solution is 4 to 6 minutes, dependent upon the thickness of the film.

*Example 3.*—The procedure is as in Example 2, with the exception that instead of the caustic soda solution therein specified, there is used a caustic soda solution of 50 per cent. strength maintained at 50° C., the duration of the treatment being 1 to 4 minutes, depending upon the thickness of the film.

*Example 4.*—The procedure is as in Example 1, with the exception that instead of the caustic soda solution therein specified, there is used a caustic soda solution of 50 per cent. strength maintained at 100° C., the duration of the treatment being 1 to 4 minutes, dependent upon the thickness of the film.

*Example 5.*—The procedure is as in Example 1, with the exception that instead of the caustic soda solution therein specified, there is used a caustic soda solution of 50 per cent. strength maintained at 140° C. the duration of the treatment being 25 seconds to 1 minute, dependent upon the thickness of the film.

*Example 6.*—The procedure is as in Example 1, with the exception that instead of the caustic soda solution therein specified, there is used a caustic soda solution of 65 per cent. strength maintained at 90° C., the duration of the treatment being 25 seconds to 1 minute, dependent upon the thickness of the film.

*Example 7.*—The procedure is as in Example 1, with the exception that instead of the caustic soda solution therein specified, there is used a caustic soda solution of 65 per cent. strength maintained at 100° C. the duration of the treatment being 20 seconds to 1 minute, dependent upon the thickness of the film.

*Example 8.*—The procedure is as in Example 1, with the exception that instead of the caustic soda solution therein specified, there is used a caustic soda solution of 65 per cent. strength maintained at 140° C. the duration of the treatment being 15 seconds to 1 minute, dependent upon the thickness of the film.

*Example 9.*—The procedure is as in Example 1, with the exception that instead of a solution of caustic soda there is used a solution of 100 per cent. strength of crystallized sodium sulphide (that is to say, sodium sulphide dissolved in its own water of crystallization) maintained at 100° C. the duration of the treatment being 4 to 10 minutes, dependent upon the thickness of the film.

*Example 10.*—A viscose containing about 6.5 per cent. of cellulose determinable by analysis and about 8 per cent. of sodium hydroxide is spread in the form of a film on a glass plate; the latter is then introduced into a solution of caustic soda of 18 per cent. strength which solution is saturated with sodium silicate at 104° C. and maintained at 104° C. The film is allowed to remain in the solution for 6 to 10 minutes, depending upon the thickness of the film. The film is then immersed in boiling water for 1 minute, washed with cold water and dried.

*Example 11.*—The procedure is as in Example 10, with the exception that, instead of the caustic soda solution of 18 per cent. strength, there is used a caustic soda solution of 22.5 per cent.

strength which solution is saturated with sodium silicate at 100° C. and maintained at 100° C. The duration of the treatment with this solution is 4 to 6 minutes, dependent upon the thickness of the film.

*Example 12.*—The procedure is as in Example 10, with the exception that, instead of the caustic soda solution of 18 per cent. strength, there is used a caustic soda solution of 50 per cent. strength which solution is saturated with sodium silicate at 50° C. and maintained at 50° C. The duration of the treatment with this solution is 1 to 4 minutes, dependent upon the thickness of the film.

*Example 13.*—The procedure is as in Example 10, with the exception that, instead of the caustic soda solution of 18 per cent. strength, there is used a caustic soda solution of 50 per cent. strength which solution is saturated with sodium silicate at 100° C. and maintained at 100° C. The duration of the treatment with this solution is 1 to 4 minutes, dependent upon the thickness of the film.

*Example 14.*—The procedure is as in Example 10, with the exception that, instead of a solution of caustic soda, there is used a solution of 30 per cent. strength of crystallized sodium sulphide saturated with sodium silicate at 100° C. and maintained at 100° C. The duration of the treatment with this solution is 4 to 10 minutes, dependent upon the thickness of the film. In this example both sodium sulphide and sodium silicate are used. With a 30% solution of sodium sulphide crystals ($Na_2S.9H_2O$) it is preferable to use also a non-acid salt.

*Example 15.*—The procedure is as in Example 14, with the difference that, instead of a solution of 30 per cent. strength of crystallized sodium sulphide, there is used a solution of 50 per cent. strength of crystallized sodium sulphide.

In Examples 1–9, the caustic soda solutions or the alkali sulphide solution may also contain sodium sulphate, sodium chloride or sodium thiosulphate up to the saturation point of the solution with respect to the salts at the temperature at which the coagulation or precipitation of the viscose is to be conducted.

In the present process there may be used caustic alkali solutions of from about 12 per cent. strength (calculated at NaOH) to solutions saturated at the temperature desired for the treatment and alkali sulphide solutions of from 25 per cent. strength (calculated as crystalline sodium sulphide) to solutions saturated at the temperature desired for the treatment. These solutions may be also saturated with a non-acid salt, as above referred to. When using either the caustic alkali solution or the alkali metal sulphide solutions, near the lower end of the range of concentrations stated, it is preferable to use also the non-acid salt, and when using stronger solutions, the said salts may also be used if desired. Temperatures from 30° to 180° C., preferably from 50° to 150° C. may be employed—provided that, when very high temperatures are used, the time of treatment be appropriately shortened.

While I have in the examples, referred specifically to films, the invention is in no sense restricted to the production of films, but covers the production of regenerated structures broadly, including coatings.

I claim:—

1. A process which comprises coagulating viscose by introducing the viscose, in shaped condition, into a solution of a coagulating reagent selected from the herein described group consisting of caustic alkali solution of at least 12% strength, and alkali metal sulphide solution of at least 25% strength, calculated as NaOH and crystalline sodium sulphide respectively, at temperatures between 30° C. and 180° C., until the coagulation is sufficiently complete.

2. A process which comprises coagulating viscose by introducing the viscose, in shaped condition, into a solution of a coagulating reagent selected from the herein described group consisting of caustic alkali solution of at least 12% strength, and alkali metal sulphide solution of at least 25% strength, calculated as NaOH and crystalline sodium sulphide respectively, at temperatures between 50° C. and 150° C., until the coagulation is sufficiently complete.

3. A method of forming coatings upon objects, which comprises the step of coating the surface of said object with viscose and subsequently introducing said objects into a coagulating bath as specified in claim 1, and at the temperatures specified therein.

4. A process as in claim 1, wherein the alkaline solution contains other precipitating agents.

5. In the art of forming a coating on an object, by applying to said object a coating of viscose, and subsequently regenerating, the improvement which comprises introducing said object with a viscose coating thereupon, into a caustic alkali solution of not less than 18 per cent. strength (calculated as NaOH), and maintained at a temperature of not substantially less than 104° C.

6. A process of forming a coating on an object which comprises forming a coating of viscose upon an object, and thereafter introducing such coated object into a bath of a solution of a substance selected from the herein described group consisting of caustic alkali and alkali metal sulphide, while said bath is at above normal room temperature, the temperature of treatment and the concentration of the alkaline solution being so adjusted to each other, that if the caustic alkali solution, figured as NaOH, is at about 18%, a temperature of at least about 104° C., is used; and if the caustic alkali solution is at about 22.5%, figured as NaOH, a temperature of at least 100° C., is used, and if the caustic alkali solution is at about 50%, figured as NaOH, a temperature of at least 50° C., is used; and if the caustic alkali solution is stronger than about 50% strength, figured as NaOH, temperatures are used at which said solution is at least in part, in a liquid state, and the alkali metal sulphide solution being substantially above 30% strength, figured as $Na_2S.9H_2O$, and a temperature not substantially below 100° C., being used therewith.

7. In the process of precipitating shaped structures, the herein described step of immersing the formed viscose structure which is of such dimensions that an alkali metal sulphide solution can readily penetrate the same, into a solution of an alkali metal sulphide containing at least 25% of such sulphide, figured as $Na_2S.9H_2O$ and containing other dissolved salts, at a temperature not substantially below 100° C.

8. In the process of precipitating shaped structures, the herein described step of treating the shaped body of viscose having at least one very small dimension, with a solution of an alkali metal sulphide, having a concentration equivalent to at least a 25% solution of crystallized $Na_2S$, at a temperature at least 30° C.

9. A method of treating viscose for the coagulation of a shaped body which comprises contacting the viscose having the shape of an artificial structure of such dimensions that a caustic alkali solution can readily penetrate the same, with a caustic alkali solution containing caustic alkali in amount equivalent to not substantially below 12% of NaOH and substantially saturated with non-acid salts, at substantially above normal room temperature.

10. A method of treating viscose for the coagulation of a shaped body which comprises contacting the viscose having the shape of an artificial structure of such dimensions that a caustic alkali solution can readily penetrate the same, with a solution selected from the herein described group of solutions consisting of caustic alkali solutions containing caustic alkali in amount equivalent to at least 12% NaOH and alkali metal sulphide solutions containing alkali metal sulphide in amount equivalent to at least 25% of crystalline sodium sulfide, and substantially saturated with non-acid salts soluble therein, such solution being at substantially above normal room temperature.

11. A method of treating viscose for the coagulation of a film, which comprises spreading out viscose into the form of a large surface, and contacting such large surface of viscose with a solution selected from the herein described group of solutions consisting of caustic alkali solutions containing caustic alkali in amount equivalent to at least 12% NaOH and alkali metal sulphide solutions containing alkali metal sulphide in amount equivalent to at least 25% of crystalline sodium sulphide, such solution being applied at a temperature at which it will cause substantially complete coagulation.

12. A method of forming coatings upon objects which comprises introducing a shaped body of viscose, into a solution selected from the herein described group of solutions consisting of caustic alkali solutions containing caustic alkali in amount equivalent to at least 12% NaOH and alkali metal sulphide solutions containing alkali metal sulphide in amount equivalent to at least 25% of crystalline sodium sulphide, and such solutions also containing non-acid salts soluble therein, such treatment being effected at a temperature substantially above normal room temperature.

13. A process as in claim 1 wherein the alkaline solution employed for precipitating the viscose contains about 50% of caustic alkali, figured as NaOH and is used at a temperature of not less than 50° C.

14. A process as in claim 1, wherein the viscose is precipitated by a solution of caustic alkali of not less than 18 per cent. strength calculated as caustic soda, at a temperature of not substantially less than 104° C.

15. A process of forming a coating on an object which comprises forming a coating of viscose upon an object, and thereafter introducing such coated object into a bath of a solution selected from the herein described group of solutions consisting of caustic alkali solutions containing caustic alkali in amount equivalent to at least 12% NaOH and alkali metal sulphide solutions containing alkali metal sulphide in amount equivalent to at least 25% of crystalline sodium sulphide, such solution being at above normal room temperature.

16. A process which comprises applying a coating of viscose upon a glass plate, introducing the glass plate carrying said coating into a solution as set forth in claim 1, under the temperature conditions as set forth in said claim, and thereafter immersing the skin in boiling hot water, and washing and drying said skin.

17. A process of making artificial materials wherein a pre-shaped thin layer of viscose is precipitated by a solution of caustic alkali of not less than 18 per cent strength calculated as caustic soda, at a temperature of not less than 104° C.

18. A process of making a film wherein a formed layer of viscose is treated with a coagulating bath of caustic alkali solution containing not less than 18 per cent caustic alkali (calculated as NaOH), while at a temperature not substantially below 104° C.

LEON LILIENFELD.